April 13, 1943.　　L. V. SMOOT ET AL　　2,316,464
SUPPORT FOR TROLLEY WIRES
Filed July 2, 1940　　2 Sheets-Sheet 1

Inventors
HARRY A. BACHLER
LEONARD V. SMOOT
By
Attorney

April 13, 1943.   L. V. SMOOT ET AL   2,316,464
SUPPORT FOR TROLLEY WIRES
Filed July 2, 1940   2 Sheets-Sheet 2
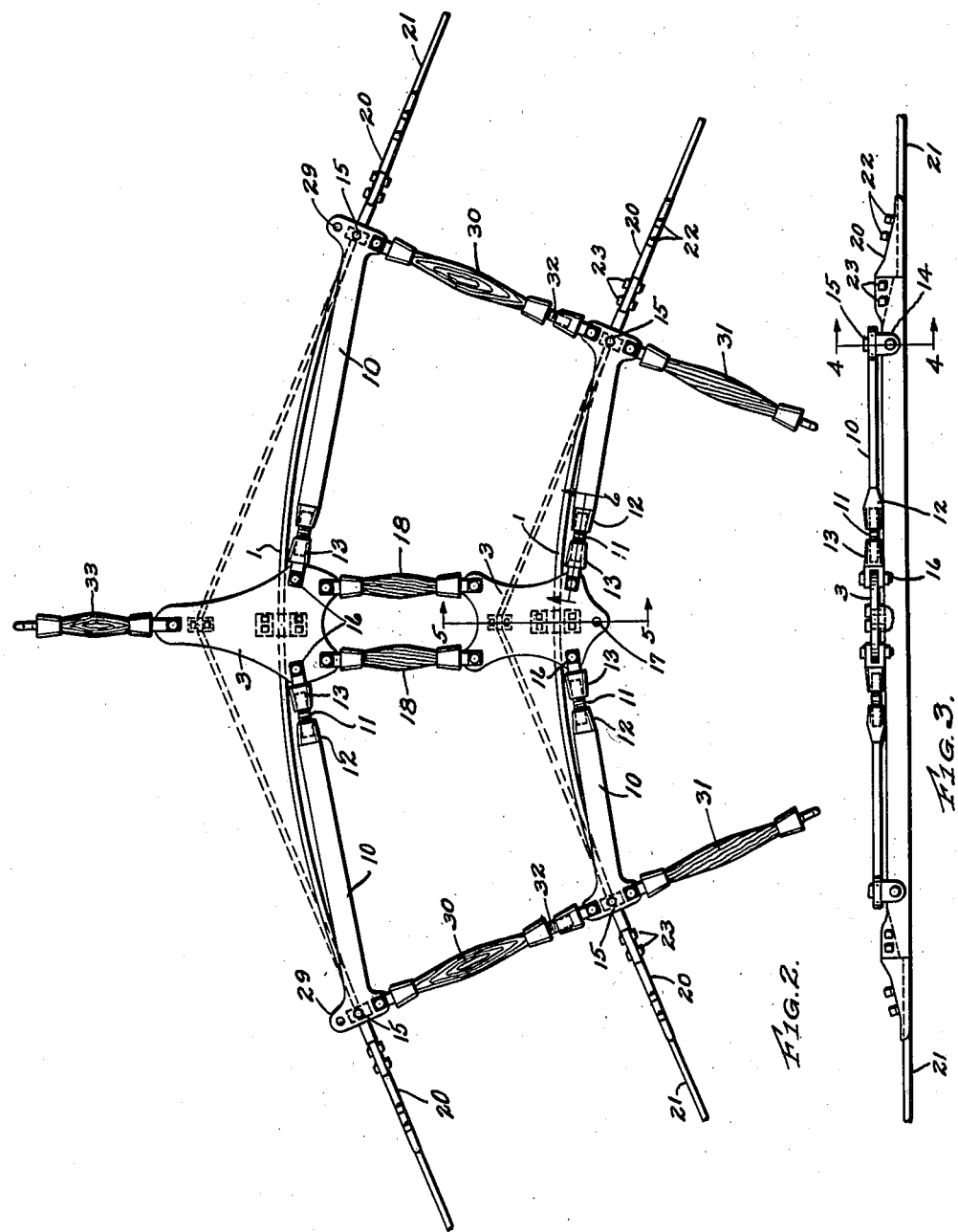
Inventors
HARRY A. BACHLER
LEONARD V. SMOOT
By
Attorney Patented Apr. 13, 1943

2,316,464

UNITED STATES PATENT OFFICE 2,316,464

SUPPORT FOR TROLLEY WIRES

Leonard V. Smoot, Newport, Ky., and Harry A. Bachler, Cincinnati, Ohio, assignors to The Ohio Brass Company, Mansfield, Ohio, a corporation of New Jersey Application July 2, 1940, Serial No. 343,596

14 Claims. (Cl. 191—40)

Our invention relates to overhead trolley constructions and more particularly to supports and curve hangers for the trolley wire.

One object of our invention is to provide a curved hanger which may be used to support the trolley wire forming a part of a curve of an overhead trolley system.

Another object of our invention is to provide a curved hanger for supporting a pair of substantially parallel trolley wires forming a part of an overhead trolley system and in insulated relation to each other.

Another object of our invention is to provide a curved hanger, the curvature of which may be adjusted to meet requirements.

A still further object of our invention is to provide a curved hanger for a pair of trolley wires, to hold the wires in spaced and insulated relation and in which the space between the trolley wires at the ends of the device may be adjusted.

Other objects and benefits of our invention will be disclosed as we more fully explain the construction and operation of our invention.

Our invention resides in the new and novel construction, combination and relation of the various parts described hereafter and shown in the drawings accompanying this specification.

In the drawings:

Fig. 2 is a top plan view of our invention as applied to two trolley wires.

Fig. 3 is an edge or side view of our invention shown in Fig. 1.

Curved hangers or segments as they are more generally termed are already in extensive use, but as a rule these devices have been to fixed curvatures and are non-adjustable and it is with difficulty or even impossible to fit these segments to meet varying conditions.

In order for a curved segment to meet requirements its curvature should be such that the ends of the same will be a tangent with the trolley wire at the ends of the segments. This is advisable in order to provide a smooth passage of the current collector off of and on to the segment and this is absolutely necessary when the trolley bus is expected to take the curves at high speed, otherwise the current collector will be thrown from the overhead structure and extreme damage to the bus or overhead system will result.

With our invention the segments may be made of any length required and on a 90° curve only two or three of our curved devices will be required to properly support and maintain the curve as compared with ten or twelve curved hangers and ears normally used for such curves and which would be distributed throughout the length of the curve.

The ordinary support for a trolley wire on a curve is a short clamp or ear, possibly six inches to fifteen inches long and uncurved, which makes a number of rather abrupt changes of curvature along the path of the current collector in rounding a curve capable of throwing the current collector off the wire at even a moderate speed.

With our invention the curvature of the segment may be altered sufficiently to bring the ends of the segments into alignment with the trolley wire thus avoiding abrupt changes in curvature of the overhead system.

In the preferred embodiment of our invention we employ a pair of curved bars or segments I which are of spring steel or other bendable metal such as a bar of ferrous metal of rectangular cross-section used on edge so that the lower edge 2 may be used to guide a current collector. Two bars or segments are employed in overhead systems for trolley bus operation as two trolley wires of opposite polarity are required since the buses operate on rubber tires and a grounded circuit therefore cannot be used.

It will be recognized however that a single segment may be employed in case it is desired to support a single trolley wire forming a part of an overhead system.

Figure 5:
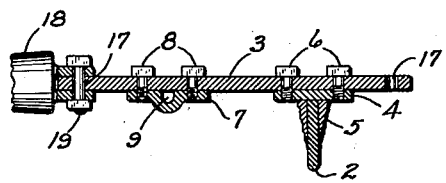
Fig. 5 is an enlarged transverse sectional view taken on the line 5—5 of Fig. 2.

The bars I have secured thereto transversely disposed plates 3 which may be of the same or different construction. In Fig. 5 is shown one method of attaching the bars I and plates 3 together. There may be secured to each bar adjacent its upper edge and its longitudinal center a lug 4 which may be attached to the bar by welding as at 5, and this lug is secured to the under side of the plates 3 by the cap screws 6.

The plates 3 are each provided with a clip 7 secured thereto by the cap screws 8 and forming a channel 9 with the plate to receive the trolley wire when a continuous trolley wire is supported. This clip 7 is also of value in receiving and holding the trolley wire when the curve is under construction and when the trolley wire is to be non-continuous as in this case when the parts of the curve are properly adjusted the portion of the trolley wire between the ends of the segments will be cut out and the approach ends of the trolley wire will be dead ended to the ends of the segments by proper tip members.

Figure 4:
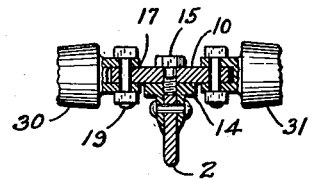
Fig. 4 is an enlarged transverse sectional view taken on the line 4—4 of Fig. 3 showing the rigid connection to the upper portion of the elongated bar.
Figure 6:
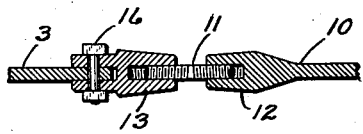
Fig. 6 is an enlarged sectional view taken on the line 6—6 of Fig. 2 showing the means of adjusting the curvature of the device.

Interposed between the ends of the bars 1 and the plates 3 are elongated members 10. These members 10 are preferably of metal and each provided with special means at the ends for attaching the ends to the bars 1 and the plates 3 with interposed means for lengthening or shortening the members 10. The said adjusting means consists of a right and left threaded stud 11 entering sockets 12 and 13 as shown in Fig. 6. The other end of each member 10 and its connection to the bar 1 is shown in Fig. 4 and comprises an angle lug 14 connected to the upper portion of the bar 1 and which in turn is attached to the member 10 by a cap screw 15. The sides of the angle lug 14 are so arranged as not to interfere with the passage of a current collector along the edge 2 of the bar 1. The socket 13 is secured to the plate 3 by the bolt 16.

The single cap screws 15 and 16 permit pivotal adjustment of the members 10 and 13 relative to bar 1 and plate 3 respectively.

The members 10 are under compression when the device is in service with stresses upon the bar 1 normal to the longitudinal axis of the bar. By rotating the stud 11 the compression member will be lengthened or shortened depending upon the direction of rotation thus changing the curvature of the bar 1.

The plates 3 are provided with openings 17 by means of which supporting means may be attached to the plates. The plates are held in spaced and insulated relation by the elongated insulating members 18 attached to the plates by bolts 19 positioned in the openings 17.

Attached to the ends of the members 1 are tips by means of which the trolley wire is held in predetermined relation to the bars 1. In Fig. 3 is shown a tip 20 to hold the ends of the severed trolley wire 21 by means of set screws 22. End tip is secured to its end of bar 1 by means of a tongue positioned in a clevis at the end of the bar 1 and the bolts 23.

Figure 8:
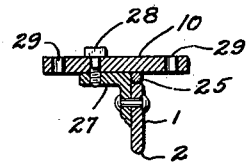
Fig. 8 is a transverse sectional view taken on the line 8—8 of Fig. 7.
Figure 7:
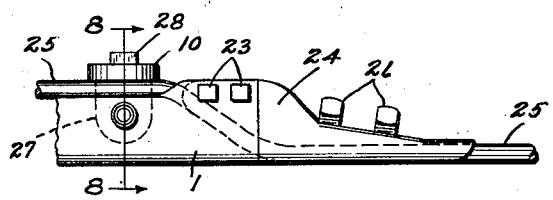
Fig. 7 is a modification of the end construction of our invention showing the manner in which our device may be used with a continuous trolley wire.

In Figs. 7 and 8 is shown a modification in construction at the end portions of the bars 1 in that the tip 20 is replaced by tip 24 which permits the use of the device with a continuous trolley wire 25. In this case the tip 24 is provided with a tongue which fits into a clevis at the end of the bar 1 and is held in place by bolts 23. The wire is held in the tip 24 by means of set screws 26.

As shown in Fig. 8 the bar 1 is secured to the end of the member 10 by means of an angle lug 27 which is secured to the bar 1 and in turn secured to the member 10 by means of the cap screws 28. In this case the trolley wire 25 extends along the upper edge of the bar 1 and below the member 10 and past the plate and is held in position on the plate 3 by the clamp 7.

The outer ends of the members 10 are provided with openings 29 and by means of which there may be rigidly secured thereto elongated insulating members 30 and 31.

The rigid connection of the rigid members 30 to the upper edge of the bar 1, as shown in Fig. 4, holds the ends of the bar in their normal upright or vertical position against the side pull of the trolley wire at the lower edge of the bar, thus preventing dewirement of the current collector.

The elongated members 30 are provided with right and left threaded studs 32 similar to studs 11 and by means of which the spacing of the ends of the bars 1 may be adjusted to meet further requirements as it may be desirable in some cases to change the spacing of the trolley wires at the ends of the bars 1 and to maintain such spacing.

Figure 1:
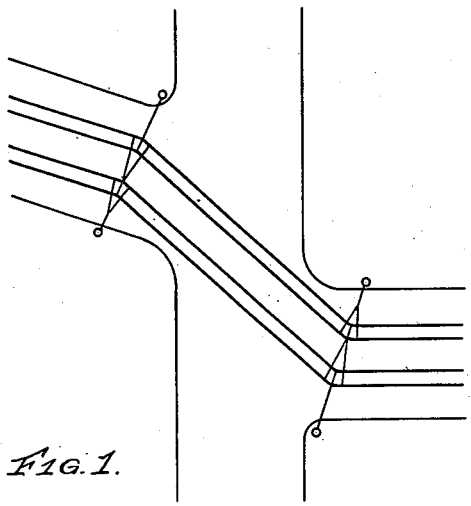
Fig. 1 is a schematic view showing the use of our invention in which are disclosed 2 pairs of trolley wires forming a part of an overhead system at a turn.

To the outer end of the upper plate 3 in Fig. 1 is attached a strain insulator 33. The strain insulators 31 and 33 may be attached to supporting span wires or other supporting means as required to support and maintain the position of the segments and trolley wires with respect to the curve.

The members 10 with their adjustable features 11, 12 and 13 maintain the curvature of the members 1 after having adjusted the curvature to meet requirements.

We wish it to be understood that we do not desire to be limited to the exact details of construction shown and described, for obviously modifications will occur to persons skilled in the art.

We claim:

1. A support for a pair of trolley wires forming a part of an overhead system comprising a pair of bendable bars each formed to a predetermined curvature, a plate for each bar disposed on opposite sides thereof and secured to the bars adjacent the longitudinal center thereof, insulating means secured to the plates and holding the members in spaced and insulated relation, each bar provided with means to change the curvature thereof and maintain said curvature after adjustment, the said means comprising members provided with means to change the length thereof and positioned on the concave side of the bars and attached to the plates and to the bars adjacent the ends thereof whereby the curvature of the bars may be changed by adjusting the length of the said members, means associated with each end of each bar to receive and hold a trolley wire in predetermined relation thereto and means associated with each plate and each adjustable member to receive supports for the plates.

2. A support for a pair of trolley wires forming a part of an overhead system comprising a pair of curved bendable bars, a transversely disposed supporting plate for each bar projecting from opposite sides thereof and secured to the bars, insulating members for positioning the bendable curved members and plates to hold the plates and bars in spaced, fixed and insulated relation, each bar provided with adjusting means extending between the ends of the bar and positioned on the concave side of the bar to increase or decrease the curvature of the bars, a portion of the insulating members provided with means to either increase or decrease the length thereof whereby the distance between the bendable bars for a portion of their length may be varied, and means associated with the bars to receive and hold each trolley wire in predetermined relation to its bar.

3. A support for a trolley wire comprising a bar of bendable metal formed to a predetermined curvature, a supporting plate attached to the bar and projecting from opposite sides thereof, means at each end of the plate to receive supporting means, means extending between the plate and the ends of the bar on the concave side thereof to maintain the curvature of the bar, means associated with the last said means to adjust the length thereof whereby the curvature of the bar may be changed and means associated with the bar to hold a trolley wire in predetermined relation thereto.

4. A support for a trolley wire comprising a bar of bendable metal formed to a predetermined curvature, a supporting plate attached to the bar and projecting from opposite sides thereof, means at each end of the plate to receive supporting means, means positioned on the concave side of the bar and having the ends thereof associated with the bar at points adjacent the ends of the bar to maintain the curvature of the bar, means associated with the last said means to adjust the length thereof whereby the curvature of the bar may be changed and means associated with the bar to hold a trolley wire in predetermined relation thereto.

5. A support for a trolley wire forming a part of an overhead system comprising a supporting plate, a bendable bar of metal attached to the under side of the plate, means connected to and extending between the plate and the ends of the bar on the concave side of the bar, the said means provided with means to adjust the length of the said means whereby the curvature of the bar may either be increased or decreased and the adjusted curvature maintained in service, and means to attach the trolley wire to the bar.

6. A trolley wire support for use on a curve of an overhead system comprising a plate, a bendable bar formed to a predetermined curvature, means at the ends of the bar to hold a continuous trolley wire in predetermined relation thereto and means on the plate to one side of the bar to receive and hold that portion of the trolley wire subtended by the bar, means on the opposite side of the bar from the last said means and extending between the plate and the bar to maintain the curvature of the bar and means associated with the last means to change the length thereof whereby the curvature of the bar may be increased or decreased and the ends of the bar brought into tangency with the trolley wire.

7. A trolley wire support for use on curves of an overhead system comprising a plate, a bendable bar formed to a predetermined curvature, means at the ends of the bar to receive and hold the adjacent ends of a severed trolley wire in predetermined relation thereto, means extending between the plate and the bar to maintain the curvature of the bar and means associated with the last said means to change the length thereof whereby the curvature of the bar may be either increased or decreased and the ends of the bar brought into tangency with the trolley wire, the means extending between the plate and the bar being under compression when the support is in service.

8. A support for a continuous trolley wire forming part of a curve on an overhead system comprising a supporting plate, means to attach the plate to supports therefor, a bar of bendable metal formed to a predetermined curvature and attached to the plate intermediate its ends, means on the plate spaced from the bar to receive the trolley wire, means associated with the bar to receive the trolley wire and hold it in predetermined relation to the bar and means connected to the plate and to the bar adjacent its ends to adjust the ends of the bar into alignment with the trolley wire, the last said means provided with means to change the distance between the ends of the bar and the supporting plate whereby the aforesaid adjustment is made.

9. A support for a pair of trolley wires forming a part of an overhead system comprising a pair of curved bendable members, a transversely disposed supporting plate for each member projecting from opposite sides thereof and secured to the members, insulating members extending between the plates to hold the bendable members in spaced and insulated relation, adjustable means extending between the ends of each bendable member on the concave side thereof to increase or decrease the curvature of the members, insulating members extending between the adjacent ends of the bendable members and provided with means to either increase or decrease the length thereof whereby the distance between the adjacent ends of the bendable members may be varied, and means associated with the bendable members to receive and hold each trolley wire in predetermined relation to its member.

10. A support for a trolley wire comprising a bar of bendable metal formed to a predetermined curvature, a supporting plate attached to the bar, means associated with the plate to receive supporting means, means extending between the ends of the bar on the concave side thereof to maintain the curvature of the bar, means associated with the last said means to adjust the length thereof whereby the curvature of the bar may be changed and means associated with the bar to hold the trolley wire in predetermined relation thereto.

11. A support for a pair of trolley wires forming a part of a curve of an overhead trolley system comprising, a pair of supporting members, one for each trolley wire, means to attach the members to supports therefor, a pair of adjustable curved bars of metal, one bar attached to each supporting member, a lower portion of each curved bar arranged to engage with and guide a current collector, insulating members securing the bars in spaced and insulated relation, means associated with each bar to connect the trolley wires thereto, means on each plate to connect the trolley wires thereto, and means connecting the ends of each bar to adjust the curvature of the bar to bring its ends into substantial alignment with the trolley wire, the last said means provided with means to change the distance between the ends of each bar.

12. An overhead trolley system comprising, a pair of continuous trolley wires, a strain plate for each trolley wire, means to attach the plates to a support, an adjustable curved bar secured to each plate adjacent the longitudinal center of the bar, means adjustable in length extending between the ends of one bar on the concave side thereof whereby the curvature of the adjustable bar may be varied by changing the length of the last said means, rigid insulating members adjustable in length for positioning the adjustable curved bars and the plates whereby the curvature of the other bar may be varied and the spacing between the adjacent bars varied, means at the ends of the bars to secure the trolley wires thereto and means on each plate to secure the trolley wire thereto.

13. A support for a pair of trolley wires comprising an adjustable curved bar for each trolley wire, a strain and supporting plate for each bar to which the bar is attached adjacent its longitudinal center, means on each plate to receive supporting means, insulating means extending between the plates to hold the plates and the bars at their center in fixed, spaced and insulated relation, means connecting the ends of one adjustable bar to maintain the curvature of the bar, means associated with the last said means to adjust the length thereof whereby the curvature of the bar may be varied, rigid insulating means provided with means to adjust the length thereof secured to each pair of the adjacent ends of the bars whereby the space between the adjacent ends of the bars may be changed and the curvature of the other adjustable bar may be varied, and means at the ends of the bars to secure the trolley wire thereto.

14. A curved support for a pair of trolley wires to guide a pair of current collectors over a portion of an overhead curve, comprising a pair of elongated curved members, means secured to the members to support the same, means to secure the trolley wires to the members and means extending between the ends of each member on the concave side thereof to adjust the curvature and to maintain the curvature thereof against the strain thereon due to the side pull of the trolley wires and means adjustable in length extending between the members at points adjacent their ends whereby the spacing of the adjacent ends of the members may be adjusted and maintained in adjusted, spaced and insulated relation.

LEONARD V. SMOOT.
HARRY A. BACHLER.